United States Patent
Goldfine et al.

(10) Patent No.: US 7,451,639 B2
(45) Date of Patent: Nov. 18, 2008

(54) ENGINE BLADE DOVETAIL INSPECTION

(75) Inventors: Neil J Goldfine, Newton, MA (US);
Mark D Windoloski, Chelmsford, MA (US); Vladimir B Tsukernik, West Roxbury, MA (US); Darrell E Schlicker, Watertown, MA (US); Todd M Dunford, Waltham, MA (US); Andrew P. Washabaugh, Chula Vista, CA (US)

(73) Assignee: JENTEK Sensors, Inc., Waltham, MA (US)

( * ) Notice: Subject to any disclaimer, the term of this patent is extended or adjusted under 35 U.S.C. 154(b) by 124 days.

(21) Appl. No.: 11/715,288

(22) Filed: Mar. 7, 2007

(65) Prior Publication Data
US 2007/0272042 A1    Nov. 29, 2007

Related U.S. Application Data

(60) Provisional application No. 60/856,081, filed on Nov. 2, 2006, provisional application No. 60/788,283, filed on Mar. 31, 2006, provisional application No. 60/780,035, filed on Mar. 7, 2006.

(51) Int. Cl.
*G01M 15/00* (2006.01)
(52) U.S. Cl. .................................. 73/112.01
(58) Field of Classification Search .............. 73/112.01, 73/112.03, 112.04, 112.05, 112.06
See application file for complete search history.

(56) References Cited

U.S. PATENT DOCUMENTS

| 5,015,951 | A | 5/1991 | Melcher |
| 5,453,689 | A | 9/1995 | Goldfine et al. |
| 5,793,206 | A | 8/1998 | Goldfine et al. |
| RE36,986 | E | 12/2000 | Melcher |
| 6,188,218 | B1 | 2/2001 | Goldfine et al. |

(Continued)

OTHER PUBLICATIONS

Auld, B.A. and Moulder, J.C., "Review of Advances in Quantitative Eddy-Current Nondestructive Evaluation," *Journal of Nondestructive Evaluation*, 18(1): 3-36 (1999).

(Continued)

*Primary Examiner*—Eric S McCall
(74) *Attorney, Agent, or Firm*—Hamilton, Brook, Smith & Reynolds, P.C.

(57) ABSTRACT

A set of curved components, such as the dovetail region of engine blades, are inspected by mounting each component into a circular carousel in a vertical orientation and rotating the carousel to move each component toward and away from an inspection site. The inspection site clamps a flexible eddy current sensor array to the curved material surface, scans the array over the surface, records the sensor position. A rigid element having a surface geometry similar to the surface shape of the component can be attached to the component to facilitate scanning of the sensor array over a component edge. The response of each sense element in the array may be converted into an effective material property and sense element proximity to the component material surface to verify the quality of the inspection scan and the presence of a defect such as a crack.

23 Claims, 9 Drawing Sheets

U.S. PATENT DOCUMENTS

| | | | |
|---|---|---|---|
| 6,745,622 B2 * | 6/2004 | Smith et al. | 73/112.01 |
| 6,784,662 B2 | 8/2004 | Schlicker et al. | |
| 7,183,764 B2 * | 2/2007 | Goldfine et al. | 324/238 |
| 7,231,817 B2 * | 6/2007 | Smed et al. | 73/112.01 |
| 7,302,851 B2 * | 12/2007 | Czerw et al. | 73/620 |
| 2002/0163333 A1 | 11/2002 | Schlicker et al. | |
| 2004/0069077 A1 * | 4/2004 | King et al. | 73/865.8 |
| 2004/0083801 A1 * | 5/2004 | Smith et al. | 73/119 R |
| 2004/0255702 A1 * | 12/2004 | King et al. | 73/865.8 |
| 2007/0089546 A1 * | 4/2007 | Roney et al. | 73/865.8 |
| 2007/0089547 A1 * | 4/2007 | Schwarz et al. | 73/865.9 |
| 2007/0107504 A1 * | 5/2007 | Smed et al. | 73/116 |
| 2007/0119255 A1 * | 5/2007 | Czerw et al. | 73/621 |

OTHER PUBLICATIONS

Dodd, C., and W. Deeds (1982), "Absolute Eddy-Current Measurement of Electrical Conductivity," Review of Progress in Quantitative Nondestructive Evaluation, vol. 1, 1982. Plenum Publishing Co.

Goldfine, N., "Magnetometers for Improved Materials Characterization in Aerospace Applications," *Materials Evaluation*, 51(3): 396-405; (1993).

Goldfine, N., et al., "Corrosion Detection and Prioritization Using Scanning and Permanently Mounted MWM Eddy-Current Arrays," Tri-Service Corrosion Conference, San Antonio, TX; (Jan. 2002).

Goldfine, N., et al., "Surface Mounted and Scanning Periodic Field Eddy-Current Sensors for Structural Health Monitoring," IEEE Aerospace Conference, Big Sky, Montana, (Mar. 2002).

* cited by examiner

ENGINE BLADE DOVETAIL INSPECTION

RELATED APPLICATIONS

This application claims the benefit of U.S. Provisional Application No. 60/780,035 filed on Mar. 7, 2006, and U.S. Provisional Application No. 60/788,283 filed on Mar. 31, 2006, and U.S. Provisional Application No. 60/856,081 filed on Nov. 2, 2006. The entire teachings of the above applications are incorporated herein by reference.

GOVERNMENT SUPPORT

The invention was supported, in whole or in part, under contracts N68335-00-D-0463 and N68335-06-C-0229, P00001 from the Navy. The Government has certain rights in the invention.

BACKGROUND OF THE INVENTION

The technical field of this invention is that of nondestructive materials characterization, particularly quantitative, model-based characterization of surface, near-surface, and bulk material condition for flat and curved parts or components using magnetic field based or eddy-current sensors. Characterization of bulk material condition includes (1) measurement of changes in material state, i.e., degradation/damage caused by fatigue damage, creep damage, thermal exposure, or plastic deformation; (2) assessment of residual stresses and applied loads; and (3) assessment of processing-related conditions, for example from aggressive grinding, shot peening, roll burnishing, thermal-spray coating, welding or heat treatment. It also includes measurements characterizing material, such as alloy type, and material states, such as porosity and temperature. Characterization of surface and near-surface conditions includes measurements of surface roughness, displacement or changes in relative position, coating thickness, temperature and coating condition. Each of these includes detection of electromagnetic property changes associated with either microstructural and/or compositional changes, or electronic structure (e.g., Fermi surface) or magnetic structure (e.g., domain orientation) changes, or with single or multiple cracks.

A specific application of these techniques is the inspection of engine blades for cracks in the dovetail regions. This is an area with significant curvature and often has other geometric features that help to hold the blade in an engine disk slot. This curvature and the geometric features can limit the effectiveness of the conventional inspection techniques, such as eddy current and ultrasonic techniques, for the detection of cracks.

Conventional eddy-current sensing involves the excitation of a conducting winding, the primary, with an electric current source of prescribed frequency. This produces a time-varying magnetic field at the same frequency, which in turn is detected with a sensing winding, the secondary. The spatial distribution of the magnetic field and the field measured by the secondary is influenced by the proximity and physical properties (electrical conductivity and magnetic permeability) of nearby materials. When the sensor is intentionally placed in close proximity to a test material, the physical properties of the material can be deduced from measurements of the impedance between the primary and secondary windings. Traditionally, scanning of eddy-current sensors across the material surface is then used to detect flaws, such as cracks.

For engine disk slot inspection, differential coil designs are typically used. These designs sense local changes in the flow of eddy currents by comparing signals in neighboring regions. For clusters of cracks, this "comparison" could occur between a sensing region on a large crack and one on a neighboring small crack or cluster of small cracks. This could significantly alter (reduce) the differential signal. Furthermore, differential coil designs are affected by local changes in proximity between the two sensed regions, e.g., if one region of a differential coil is at a different lift-off than the other.

SUMMARY OF THE INVENTION

Aspects of the methods described herein involve fixtures and flexible sensor arrays for the inspection of conducting and/or magnetic material properties of complex shaped components. These fixtures and sensor arrays promote rapid and automated scanning for a set of these components and accurate modeling of the response which provides enhanced capabilities for the creation of images of the properties of a test material.

In an embodiment, each component of a set of components, such as the each of the blades at a particular stage of a turbine engine, are mounted into a carousel for automated inspection of the quality of each component. The carousel, typically having a circular shape, may sequentially rotate each component into position to be inspected and then move the component away after inspection while moving another component into position at the inspection site. Each component may be held in a vertical orientation to facilitate the inspection process. As part of the inspection, a flexible eddy current sensor array may be placed near the curved material surface of the component to be inspected and may be held in place by a clamp. The sensor may have at least one row of aligned sense elements and may promote imaging of the inspection surface since image can be created with only the array data and a record of the linear position of the array. Typically, as part of the measurement, the response of each sense element may be converted into an effective property, such as the electrical conductivity of the inspected material, and sense element lift-off or proximity to the material surface. This effective property is then used to qualify the quality of the component, such as the presence and size of a crack.

In a particular embodiment, the curved material surface may be the dovetail for an engine blade. In an embodiment, the lift-off information may be used to qualify the scan by ensuring that the lift-off is within an acceptable range. In an embodiment, an image of the effective property data may be superimposed on design image or rendering of the component. Furthermore, by inspecting the component at multiple times throughout the useful lifetime of the component, the progression of any damage or changes in the material state can be tracked.

In an embodiment, a rigid element such as a slotted rod may be attached to each component in order to hold the component in a vertical orientation and to facilitate the inspection of the edge of the component material. The rigid element provides an extension surface that approximates the curvature of the curved material surface to be inspected and is typically longer than the length of the sensor array used in the inspection so that the sensor array can be scanned completely over the edge and off of the component material surface. By matching the shape of the surface, scanning over the edge in the component surface leads to a change in mechanical stresses on the sensor that are substantially smaller than the mechanical stress that would result if the rigid element is not present. In a particular embodiment, the rigid element may be aligned with the curved material surface of the component by inserting at least one cylindrical support, such as a dowel, into a hole of the component. In an embodiment, the rigid element may be aligned with the curved material surface by using a raised edge of the component.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The teachings of all patents, published applications and references cited herein are incorporated by reference in their entirety.

The use of conformable eddy-current sensors and sensor arrays is described for the nondestructive characterization of components having complex shapes and surfaces. In particular, engine blades and the dovetails of these blades that are used for insertion into slots of engine disks have complex surface geometries. It is important to be able to reliably detect cracks in these regions, as the presence of cracks can compromise the structural integrity of the engine and can lead to engine failure if the cracks are too large. The flexible eddy current sensors can provide absolute property measurements and high-resolution two-dimensional (C-scan) images of cracks on engine blades. These inspections can be achieved with automated and manual scanning for detection of cracks. Calibration is performed in air or on a non-conducting material and detection thresholds are set based on prior experience. Robustness is achieved using model-based methods where the proximity of each sense element to the material surface or lift-off is determined and, by verifying that it is in an acceptable range, used to qualify the quality of the scan. The other information obtained from each sense element, such as an effective electrical conductivity, and possibly the lift-off as well, is then used to determine the presence of a crack. This also allows crack lengths to be estimated.

Figure 1:
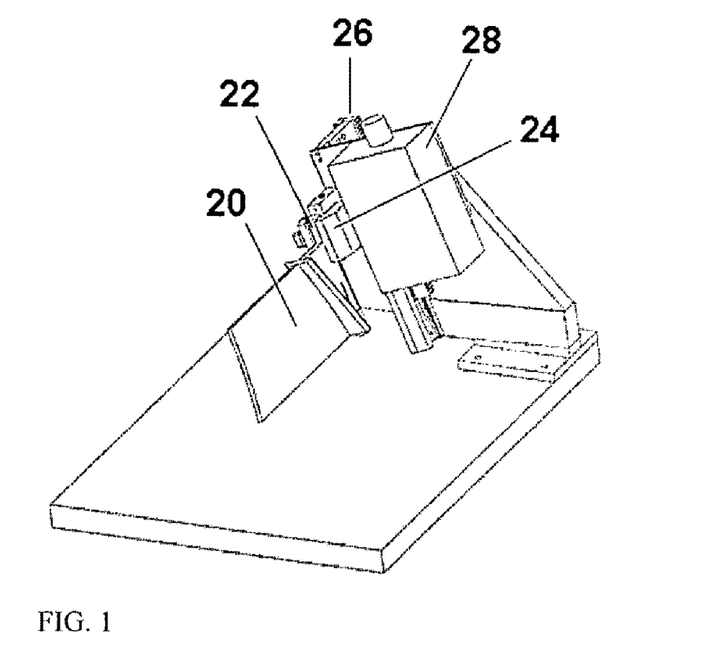
FIG. 1 is an isometric drawing of a fixture for inspecting engine blade dovetails.
Figure 2:
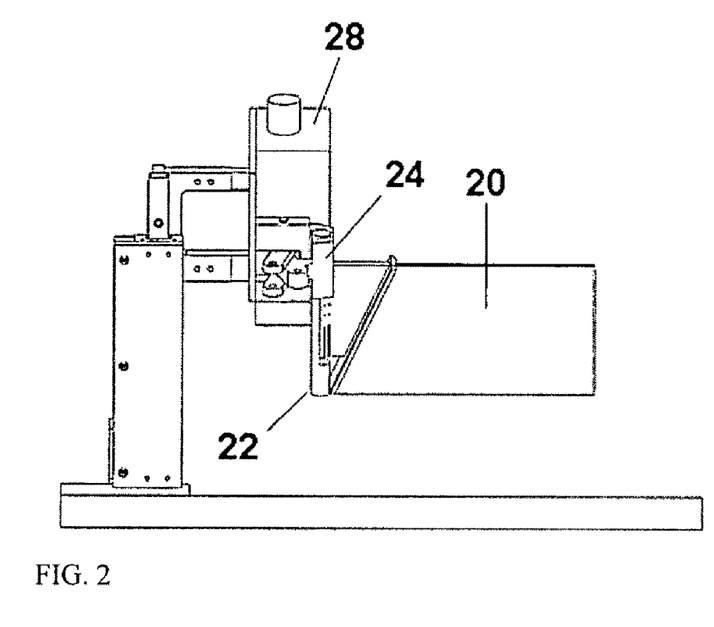
FIG. 2 is a side view of the fixture of FIG. 1 for inspecting engine blade dovetails.

An example configuration of a fixture for scanning blade dovetails is shown in FIGS. 1 and 2. A blade 20 is mounted onto a rigid element 22, such as a slotted rod, by inserting the dovetail of the blade into the slot. The curvature of the slotted rod matches that of the dovetail to allow for smooth scanning over the edges of the dovetail. A scanning MWM-Array is mounted to a clamp 24 which is actuated by a pneumatic cylinder. The clamp is attached to a movable plate which rides along a linear slider with a gear rack 26. The probe electronics unit 28, to which the sensor is connected, is also attached to the movable plate. During the scan, the sensor moves relative to the stationary blade. The motion of the linear slider is typically motorized. The scan is performed in two parts each beginning near the middle of the dovetail and proceeding toward one or the other end. There is some overlap of the two parts of the scan to ensure complete coverage of the dovetail. With this configuration, when scanning multiple blades, after each scan, one blade must be removed and a new blade mounted before a new scan can begin.

Figure 3:
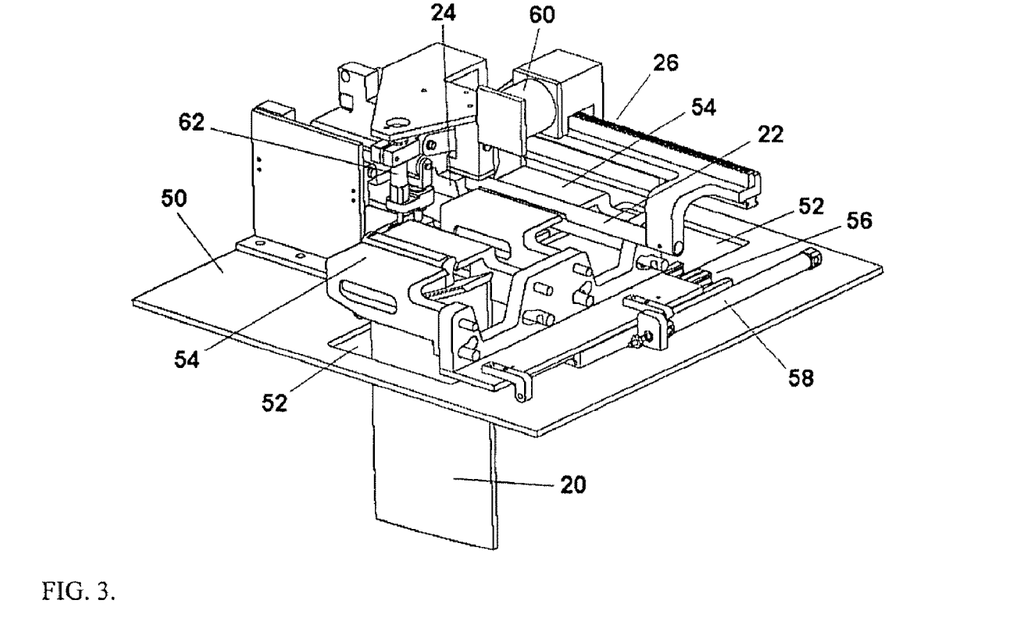
FIG. 3 is a drawing of another fixture for inspecting engine blade dovetails.
Figure 4:
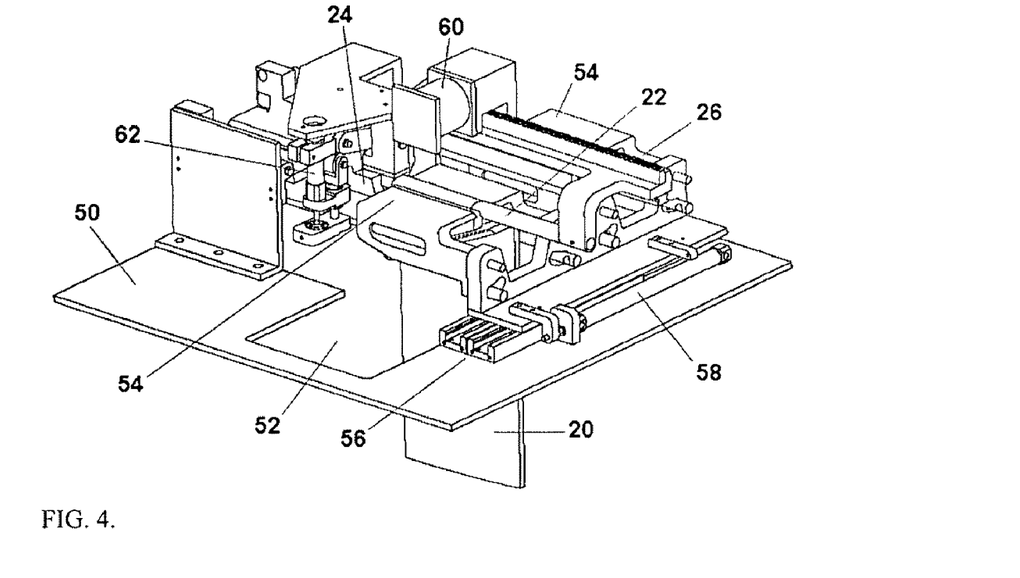
FIG. 4 is a drawing of a fixture with the blade moved into position to be inspected.
Figure 5:
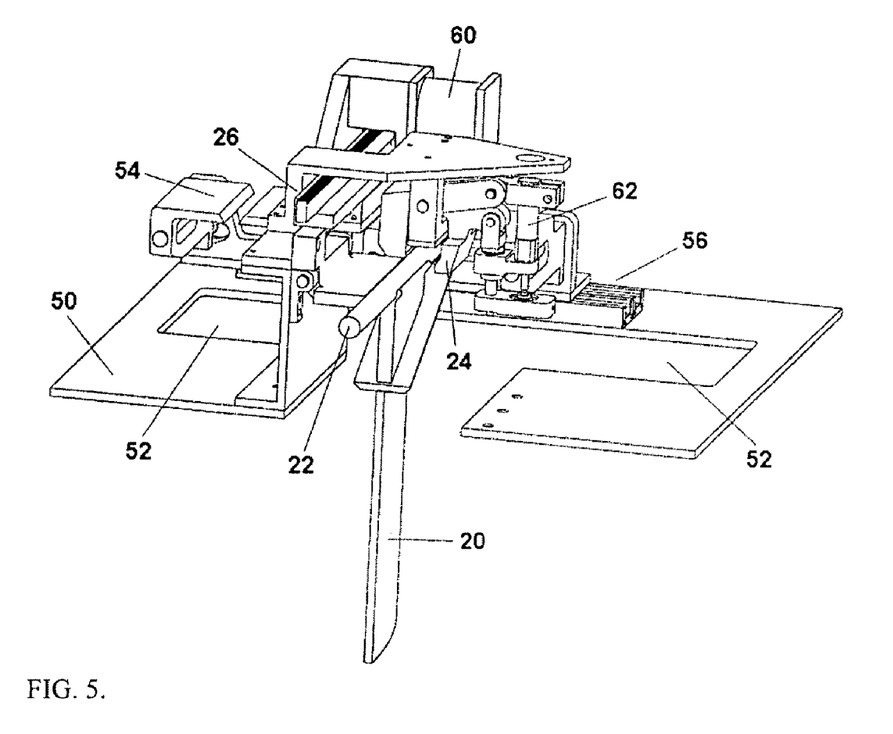
FIG. 5 is a drawing of a different view of the fixture of FIG. 4.

FIGS. 3-5 show an example configuration of a fixture for scanning blade dovetails which allows the operator to load a new blade while scanning of another blade is in progress. The fixture is mounted to a frame 50 with two cutouts 52 for blade loading. There are two spring loaded clamps 54 which are mounted to a linear slider 56. The linear slider is actuated by a pneumatic cylinder 58. A blade 20 is inserted from below into the spring loaded clamp which is positioned over one of the cutouts as shown in FIG. 3. The blade, carried by the spring loaded clamp, is moved into position to start the scan such that the dovetail slides into the slot in the rod 22 as shown in FIG. 4. The slotted rod is connected to a linear slider with gear rack 26 which is actuated by an electric motor 60. As with the example configuration shown in FIG. 1, a scanning MWM-Array is mounted to a clamp 24 which is actuated by a pneumatic cylinder 62. In this case, the blade is moved relative to the stationary sensor. The blade slides with the slotted rod out of the spring loaded clamp and into the sensor clamp. The scan is performed in two parts as described above. During the scan, the other spring loaded clamp is positioned over the other loading cutout and a new blade can be loaded. Once the scan of the first blade is complete and it has been released and removed from the fixture, the second blade will be moved into position and scanned. The inspection of multiple blades proceeds in this way, with the operator alternately loading blades into one spring loaded clamp and the other.

Figure 6:
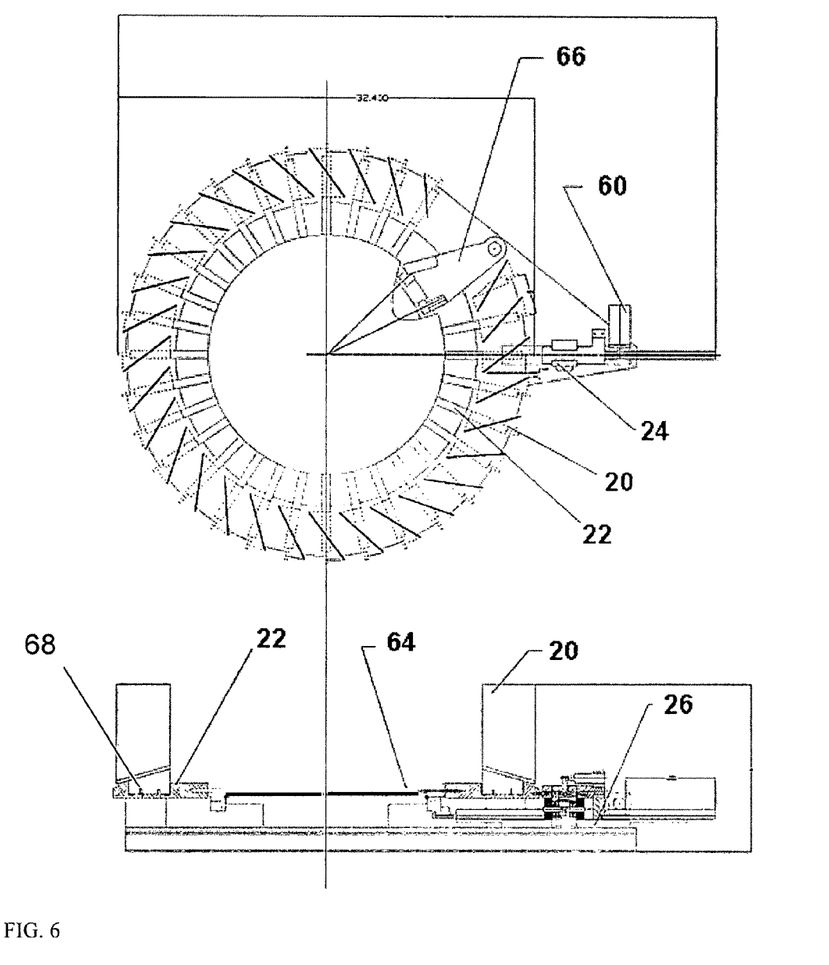
FIG. 6 is a drawing of a carousel and fixture for inspecting blade dovetails.

FIG. 6 shows a configuration of a fixture for scanning blade dovetails which allows the operator to load a full set of thirty-two blades onto a carousel. Each blade 20 is mounted onto one of the slotted rods 22 which are attached to a turntable 64. In this case, there are features or holes 68 in the blade so that cylindrical supports or dowels can be inserted into the blade, providing an attachment to the rigid element or slotted rod. This keeps the blades in a vertical orientation. For components or blades that do not have such features or holes, rigid supports or beams can be located between adjacent pairs of the components to maintain the component orientation. In addition, raised edges on the blades can be used to help with the alignment of curved surface for both the rigid element and the blade. In operation, one blade at a time is in position for scanning. After a blade is scanned the carousel rotates the next blade into position for scanning at the inspection site. The automatic rotation of the carousel is provided by an arm mechanism 66 actuated by a pneumatic cylinder. As with the configurations described above, the blade dovetail is scanned by an MWM-Array mounted to a clamp 24 which is attached to a linear slider with gear rack 26 actuated by an electric motor 60. In this case the sensor is moved relative to the stationary dovetail. The scan is performed in two parts as described above. With this configuration, once the operator has loaded the set of blades onto the carousel, the scanning of all thirty-two blades proceeds automatically. Note that placing additional inspection sites around the carousel would allow the inspection of the full set of blades to be performed faster.

Figure 7:
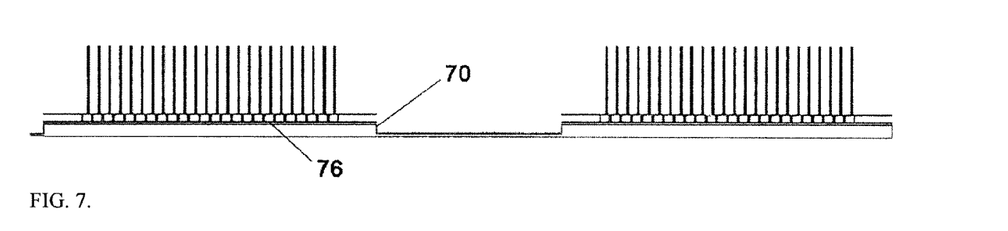
FIG. 7 is a drawing of a flexible eddy current sensor array having two sets of sense elements parallel to a drive winding.

A drawing of an MWM-Array for scanning blade dovetails is shown in FIG. 7. The MWM-Array is mounted to the scanning clamp such that the extended portions of the primary winding are perpendicular to the scan direction. The scan produces a quantitative image of the electrical conductivity and lift-off. To highlight the presence of the cracks and the quality of the scans, color coded images can be used. The conductivity image is typically used for crack detection. For example, by setting an appropriate threshold based on the crack side of interest, the effective conductivity of the scanned area can be shown in shades of blue except for areas with cracks that produce a drop in effective conductivity below a threshold value, which can be shown in a different color such as red. For crack detection capability with small threshold size, such as 0.015 in. long by 0.007 in. deep, spatial filters are typically also used, such as those described in U.S. Pat. No. 6,784,662. The lift-off image is typically used to qualify the scan. For example, an acceptable lift-off can be shown in green, a questionable lift-off in yellow or orange, and an unacceptable lift-off in red.

Figure 8:
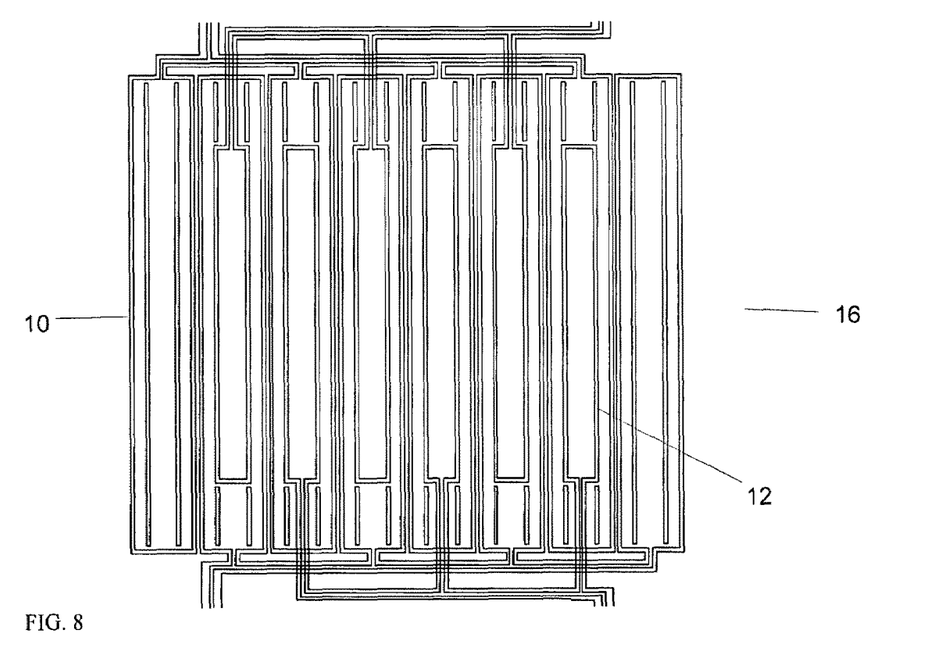
FIG. 8 is a drawing of a spatially periodic field eddy-current sensor.

To better understand the operation of the eddy-current sensor, consider the Meandering Winding Magnetometer (MWM®) shown in FIG. 8. The basic operation of an MWM sensor 16 is described in detail in U.S. Pat. Nos. 5,015,951, 5,453,689, 5,793,206, and 6,188,218. The sensor includes a primary winding 10 having extended portions for creating the magnetic field and secondary windings 12 within the primary winding for sensing the response. The primary winding is fabricated in a spatially periodic pattern with the dimension of the spatial periodicity termed the spatial wavelength $\lambda$. A current is applied to the primary winding to create a magnetic field and the response of the MUT to the magnetic field is determined through the voltage measured at the terminals of the secondary windings. This geometry creates a magnetic field distribution similar to that of a single meandering winding. A single element sensor has all of the sensing elements connected together. The magnetic vector potential produced by the current in the primary can be accurately modeled as a Fourier series summation of spatial sinusoids, with the dominant mode having the spatial wavelength $\lambda$. For an MWM-Array, the responses from individual or combinations of the secondary windings can be used to provide a plurality of sense signals for a single primary winding construct as described in U.S. Pat. No. 5,793,206 and Re. 36,986.

In operation, the drive windings for the sensors are excited with a current at a prescribed frequency, for magnetoquasistatic (MQS) inspection of metals. When interrogating a conducting material, for example, in an aircraft engine disk slot or bolt hole, the current in the drive produces a time varying magnetic field that induces eddy currents in the material under test. These induced eddy currents within the metal follow the same path as the linear drive segments. In other words, the eddy current pattern, induced in the material under test, looks like a reflected image of the drive winding geometry. When a crack, corrosion damage, an inclusion, surface roughness, or an internal geometric feature alters the flow of these eddy currents, then the inductive sensing coils sense an absolute magnetic field that is altered locally by the presence of the crack or other damage. The use of absolute inductive sensing coils, instead of differential sensing coils, permits the use of models based on physical principles to analyze the data. For example, the goal might be to measure the sensor proximity to the surface, called the lift-off, at each sensing element and the electrical conductivity of the material along the path of the induced eddy currents. A model-based inversion then permits, for example, independent conductivity and lift-off measurements. Conventional eddy current sensors with absolute or differential elements empirically correct for lift-off instead of using a physical model.

Figure 9:
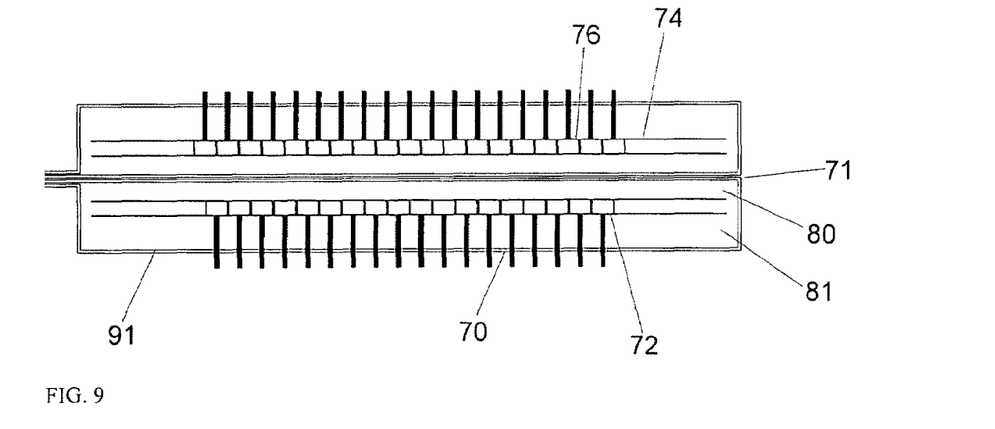
FIG. 9 is an expanded view of the drive and sense elements for an eddy-current array having offset rows of sensing elements.
Figure 10:
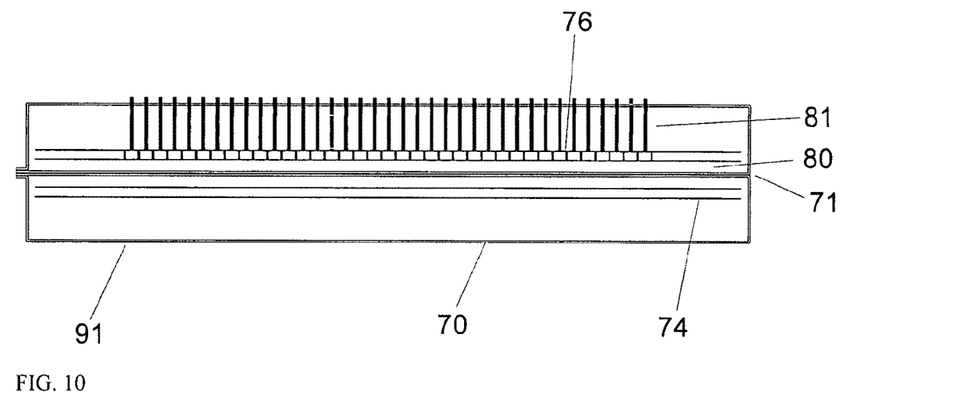
FIG. 10 is an expanded view of the drive and sense elements for an eddy-current array having a single row of sensing elements.

Eddy-current sensor arrays comprised of at least one meandering drive winding and multiple sensing elements can also be used to inspect the test material. Example sensor arrays are shown in FIGS. 7, 9, and 10. The arrays includes a primary winding 70 having extended portions for creating the magnetic field and a plurality of secondary elements 76 within the primary winding for sensing the response to the MUT. The secondary elements are pulled back from the connecting portions of the primary winding to minimize end effect coupling of the magnetic field. Dummy elements 74 can be placed between the meanders of the primary to maintain the symmetry of the magnetic field, as described in U.S. Pat. No. 6,188,218. When the sensor is scanned across a part or when a crack propagates across the sensor, perpendicular to the extended portions of the primary winding, secondary elements 72 in a primary winding loop adjacent to the first array of sense elements 76 provide a complementary measurement of the part properties. These arrays of secondary elements 72 can be aligned with the first array of elements 76 so that images of the material properties will be duplicated by the second array. Alternatively, to provide complete coverage when the sensor is scanned across a part the sensing elements, can be offset along the length of the primary loop or when a crack propagates across the sensor, perpendicular to the extended portions of the primary winding, as illustrated in FIG. 9.

The dimensions for the sensor array geometry and the placement of the sensing elements can be adjusted to improve sensitivity for a specific inspection. For example, the effective spatial wavelength or the distance between the central conductors 71 and the current return conductor 91 can be altered to adjust the sensitivity of a measurement for a particular inspection. For the sensor array of FIG. 9, the distance 80 between the secondary elements 72 and the central conductors 71 is smaller than the distance 81 between the sensing elements 72 and the return conductor 91. An optimum response can be determined with models, empirically, or with some combination of the two. An example of a modified sensor design is shown FIG. 10. In this sensor array, all of the sensing elements 76 are on one side of the central drive windings 71. The size of the sensing elements and the gap distance 80 to the central drive windings 71 are the same as in the sensor array of FIG. 9. However, the distance 81 to the return of the drive winding has been increased, as has the drive winding width to accommodate the additional elements in the single row of elements. Another example of a modified design is shown in FIG. 7. Here, the sensing elements are located in two groups to provide complete coverage of both sides of the blade dovetail.

The use of relatively small sensing elements, e.g., down to 1 mm by 1 mm (0.04 in. by 0.04 in.) or smaller squares in an array, permits high resolution imaging of absolute properties. High resolution imaging is critical for detection of small cracks, while absolute imaging is critical to correct robustly for lift-off variations and to provide reliable crack responses for cracks that form in clusters.

The MWM sensor and sensor array structure can be produced using micro-fabrication techniques typically employed in integrated circuit and flexible circuit manufacture. This results in highly reliable and highly repeatable (i.e., essentially identical) sensors, which has inherent advantages over the coils used in conventional eddy-current sensors. As indicated by Auld and Moulder, for conventional eddy-current sensors "nominally identical probes have been found to give signals that differ by as much as 35%, even though the probe inductances were identical to better than 2%" [Auld, 1999]. This lack of reproducibility with conventional coils introduces severe requirements for calibration of the sensors (e.g., matched sensor/calibration block sets). In contrast, duplicate MWM sensor tips have nearly identical magnetic field distributions around the windings as standard micro-fabrication (etching) techniques have both high spatial reproducibility and resolution. The sensor response can be accurately modeled which dramatically reduces calibration requirements. For example, calibration in air can be used to measure an absolute electrical conductivity without calibration standards. The windings are typically mounted on a thin and flexible substrate, producing a conformable sensor. The insulating layers can be a flexible material such as Kapton™, a polyimide available from E.I. DuPont de Nemours Company.

For eddy current sensors operating at high frequencies, the induced eddy currents are confined to a thin layer (due to the skin effect) near the surface, while at low frequencies this layer penetrates deeper into the material under test where it is limited by the sensor geometry. For MWM sensors and MWM-Arrays, the depth of penetration of the magnetic field into the material under test at lower frequencies is also limited to a fraction of the drive winding spatial wavelength, $\lambda$. The depth of penetration of magnetic fields into titanium or nickel alloys at higher frequencies is approximately equal to the conventional skin depth $\delta = (2/\omega\mu\sigma)^{1/2}$, where $\omega = 2\pi f$ is the angular frequency for frequency f, $\mu$ is the magnetic permeability, and $\sigma$ is the electrical conductivity. For lower frequencies, the MWM field depth of penetration for each spatial Fourier mode n is $1/\mathrm{Re}(\Gamma_n)$, where $$\Gamma_n = \sqrt{k_n^2 + j\omega\mu\sigma} = \sqrt{(2\pi n/\lambda)^2 + j2/\delta^2}$$

Figure 11:
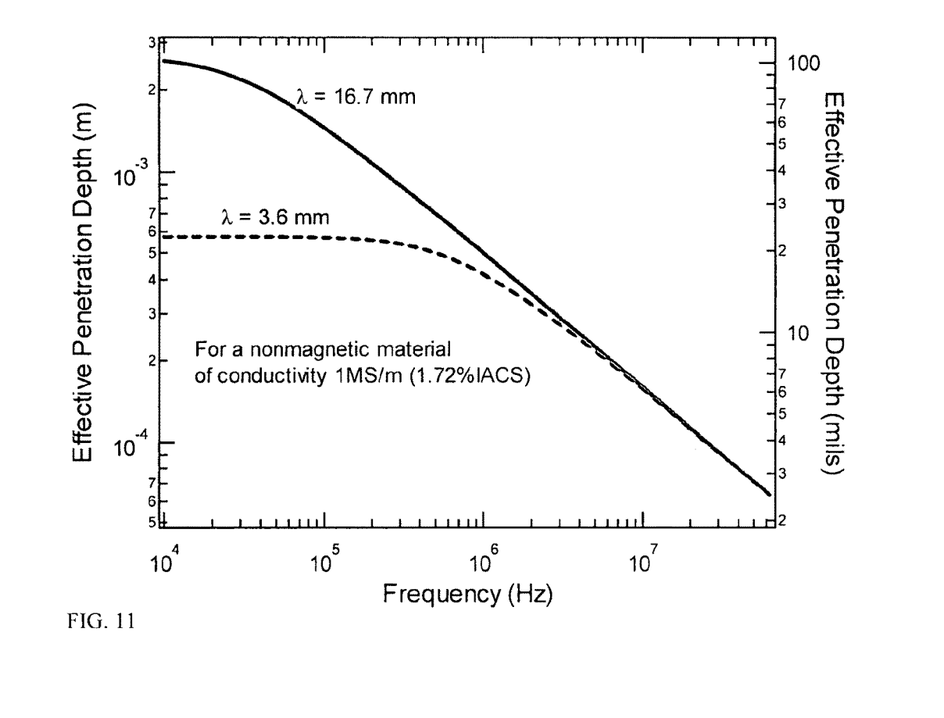
FIG. 11 is a plot of the depth of penetration for a typical titanium or nickel alloy with assumed conductivity of 1 MS/m (1.72% IACS), as a function of temporal frequency and MWM spatial wavelength.

$k_n = 2\pi n/\lambda$ is the spatial mode number, and $\lambda$ is the spatial wavelength of the drive winding (Goldfine, 1993). The fundamental spatial mode (n=1) has the greatest depth of penetration, with a spatial wavelength equal to $\lambda$. This spatial wavelength is taken as two times the spacing between the linear drive segments and is similar to that of a coil with a diameter approximately equal to the half wavelength. For the same drive current frequency the magnetic fields from a longer wavelength (e.g., 16.7 mm) sensor will penetrate deeper into the material under test than the fields from a shorter wavelength (e.g., 3.6 mm) sensor. As shown in FIG. 11, this is true at relatively low frequencies, e.g., under 1 MHz for titanium or nickel alloys. Over 10 MHz the wavelength does not significantly affect the depth of penetration of the fields. A typical frequency used in single frequency measurements of engine blades is 2 MHz. However, for crack detection and length, location, and depth determination multiple frequency methods can be used.

For the MWM and MWM-Arrays, the sensor response at each sensing element is typically obtained in terms of the magnitude and phase (or real and imaginary part) of the transinductance. The transinductance is equal to the transimpedance divided by the angular frequency, $\omega=2\pi f$, where f is the frequency of the applied drive winding current. The transimpedance is the voltage measured at the two terminals of the sensing elements $v_s$ divided by the applied current $i_d$.

$$\text{transimpedance} = \frac{\text{sensing element voltage}}{\text{drive winding current}} = \frac{v_s}{i_d}$$

For the original MWM sensor of FIG. 8, the sensing element voltage is the sum of the voltages induced on each set of meandering secondaries. The transinductance is then $$\text{transinductance} = \frac{\text{transimpedance}}{j2\pi f} = \frac{v_s}{j2\pi f i_d}$$

where $j=(-1)^{1/2}$. The transinductance has the units of inductance and reflects the inductive coupling between the drive winding and sensing elements.

Any model-based nondestructive testing approach requires that the sensor behavior match the model predictions for the material under test. Furthermore, to be practical, each individual sensor should be essentially identical. The MWM was designed to provide responses that matched the behavior of analytical models derived from basic physical principles. In contrast, eddy current sensors are typically designed to be very sensitive and then the response is modeled without trying to redesign the sensor to reduce the error between the actual and predicted response (Dodd, 1982). One benefit of designing the sensor to match a model is a simplified calibration procedure. To calibrate, a measurement is simply performed in air, away from any conducting or magnetic media. This "air calibration," described in U.S. Pat. No. 6,188,218, corrects for variations in cable capacitance, unmodeled inductive coupling and drift in instrumentation. Most importantly, this air calibration permits the measurement of absolute electrical properties that are robust and can reflect, for example, microstructure of the material under test. These measurements are often directly comparable to literature values for the material properties. As part of the calibration, measurements are sometimes also performed with a "shunt" sensor that has the connection leads at the sense element shorted together. This provides a direct measurement of the parasitic effect of the leads on the measurement response. Preferably, the shunt measurement is performed with the shunt sensor on the component, or a part with similar properties as the component, to be inspected so that the calibration conditions mimic the inspection conditions as well as possible.

Scanning arrays provide imaging of flaws in metallic components. For example, MWM-Array images revealed distributed microcracks, small cracks and visible macrocracks in an aluminum four-point bending fatigue specimen (Goldfine, March 2002). Images can be obtained with the sensor in different orientations. The MWM-Array is most sensitive to cracks that are oriented perpendicular to the linear drive segments (note that the induced eddy currents are dominantly in the direction of the longer linear drive segments). The MWM remains sensitive to cracks oriented as much as 75 degrees from this perpendicular orientation and even higher in the case of macrocracks and EDM notches. EDM notches can be easily detected even when they are parallel to the drive windings, which is the disadvantage of EDM notches for demonstrating sensitivity. Because they are not as tight as real cracks, they can be detected at all orientations. Since the array is sensitive to cracks that are as much as 75 degrees away from the perpendicular orientation, two scans can be performed, with drive winding orientations that differ by at least 15 degrees, to detect cracks in all orientations.

Deep penetration sensors, which have a longer spatial wavelength, provide the capability to image hidden geometric features in engine components, measure wall thickness in turbine blades, and the ability to manually scan wide areas and build high resolution images without expensive scanners. This ability to detect subsurface damage, demonstrated for hidden corrosion damage (Goldfine, January 2002), is also useful for detection of subsurface anomalies in engine disks, such as buried inclusions.

An efficient method for converting the response of the MWM sensor into material or geometric properties is to use grid measurement methods. These methods map the magnitude and phase (or real and imaginary parts) of the sensor impedance into the properties to be determined and provide for a real-time measurement capability. The measurement grids are two-dimensional databases that can be visualized as "grids" that relate two measured parameters to two unknowns, such as the electrical conductivity (or magnetic permeability) and lift-off (where lift-off is defined as the proximity of the MUT to the plane of the MWM windings). For the characterization of coatings or surface layer properties, three- (or more)-dimensional versions of the measurement grids called lattices and hypercubes, respectively, can be used. Alternatively, the surface layer parameters can be determined from numerical algorithms that minimize the error between the measurements and the predicted responses from the sensor.

Figure 12:
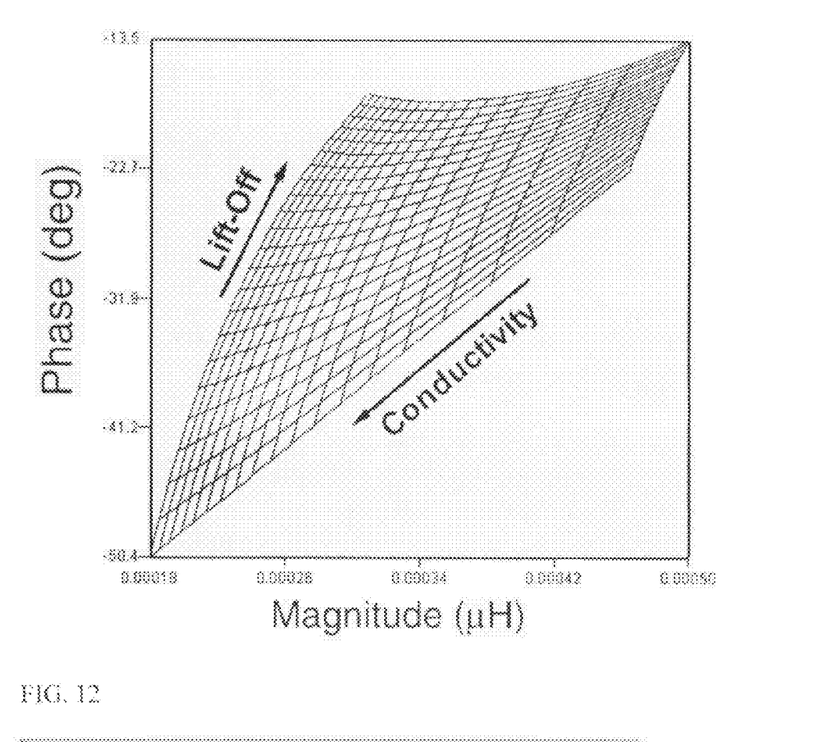
FIG. 12 shows a representative measurement grid relating the magnitude and phase of the sensor terminal impedance to the lift-off and electrical conductivity.

An advantage of the measurement grid method is that it allows for real-time measurements of the absolute electrical properties of the material and geometric parameters of interest. The database of the sensor responses can be generated prior to the data acquisition on the part itself, so that only table lookup operation, which is relatively fast, needs to be performed. Furthermore, grids can be generated for the individual elements in an array so that each individual element can be lift-off compensated to provide absolute property measurements, such as the electrical conductivity. This again reduces the need for extensive calibration standards. In contrast, conventional eddy-current methods that use empirical correlation tables that relate the amplitude and phase of a lift-off compensated signal to parameters or properties of interest, such as crack size or hardness, require extensive calibrations and instrument preparation. A representative measurement grid for a low-conductivity nonmagnetic metal (e.g., titanium alloys, some super alloys, and austenitic stainless steels) is illustrated in FIG. 12.

Figure 13:
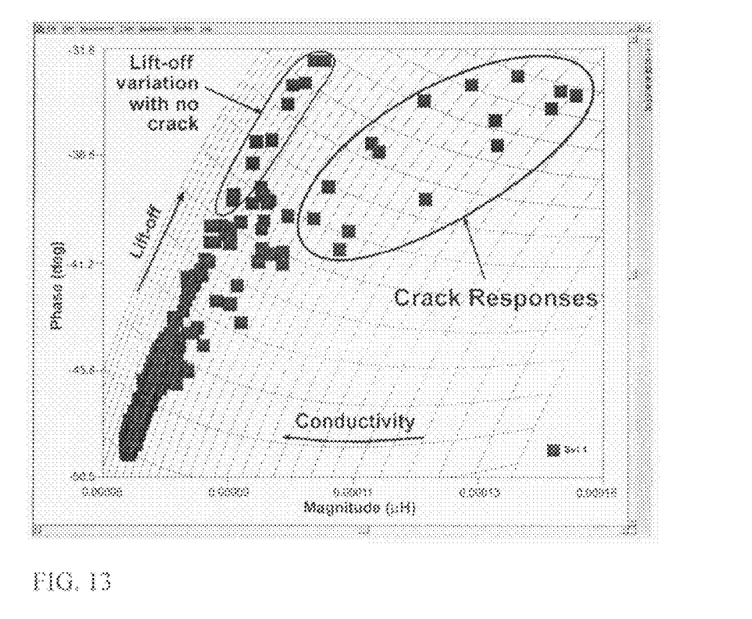
FIG. 13 shows a representative measurement grid relating the magnitude and phase of the sensor terminal impedance to the lift-off and electrical conductivity.

FIG. 13 shows an example of a measurement grid used to estimate the conductivity and lift-off for a high conductivity nonmagnetic metal (e.g., aluminum alloy). In this case, the model assumed that the material under test (MUT) was an infinite half space (i.e., a single layer of infinite thickness). This is a reasonable assumption when the skin depth is small compared to the actual thickness of the material under test (as for an engine blade). It also assumed an air gap (or insulating layer) exists between the sensor and the first conducting surface. This "air gap" is called the lift-off. The data shown in FIG. 12 is for a single channel (sensing element) of an MWM-Array as it is scanned across a surface. For more complicated problems, such as a crack under a coating on a turbine blade, the two unknowns might be the lift-off and the conductivity of the substrate, using a three-layer model (i.e., the lift-off gap is one layer, the coating is a second layer, and the substrate is a third, infinitely thick layer). Alternatively, two or more frequencies can be used with multi-dimensional databases to estimate more than two unknown properties.

For measuring the response of the individual sensing elements in an array, multiplexing between the elements can be performed. However, this can significantly reduce the data acquisition rate so a more preferably approach is to use an impedance measurement architecture that effectively allows the acquisition of data from all of the sense elements in parallel. To perform absolute measurements of material properties, to robustly correct images for lift-off variations caused by varying surface roughness and curvature, and to develop reliable multiple frequency crack response signals, it is essential to generate robust impedance data across multiple frequencies and across wide ranges of impedance magnitude and phase. This type of instrument is described in detail in U.S. patent application Ser. No. 10/155,887, filed May 23, 2002, (U.S. Patent Application Publication No. 2002/0163333, published Nov. 7, 2002), the entire teachings of which are incorporated herein by reference. This instrumentation can acquire data from 39 fully parallel impedance channels (magnitude and phase) simultaneously in less than 10 milliseconds (e.g., 100 measurements per second on 39 channels simultaneously). This speed is critical for increasing throughput rates for inspection of wide areas such as the entire internal surface of an engine disk slot, or a bore, a web region, or a high aspect ratio bolt hole in an engine disk. To perform measurements with the grid methods and air calibration, each channel must provide a robust and accurate measurement of absolute impedance. The use of multiple sensing elements with one meandering drive and parallel architecture measurement instrumentation then permits high image resolution in real-time.

Figure 14:
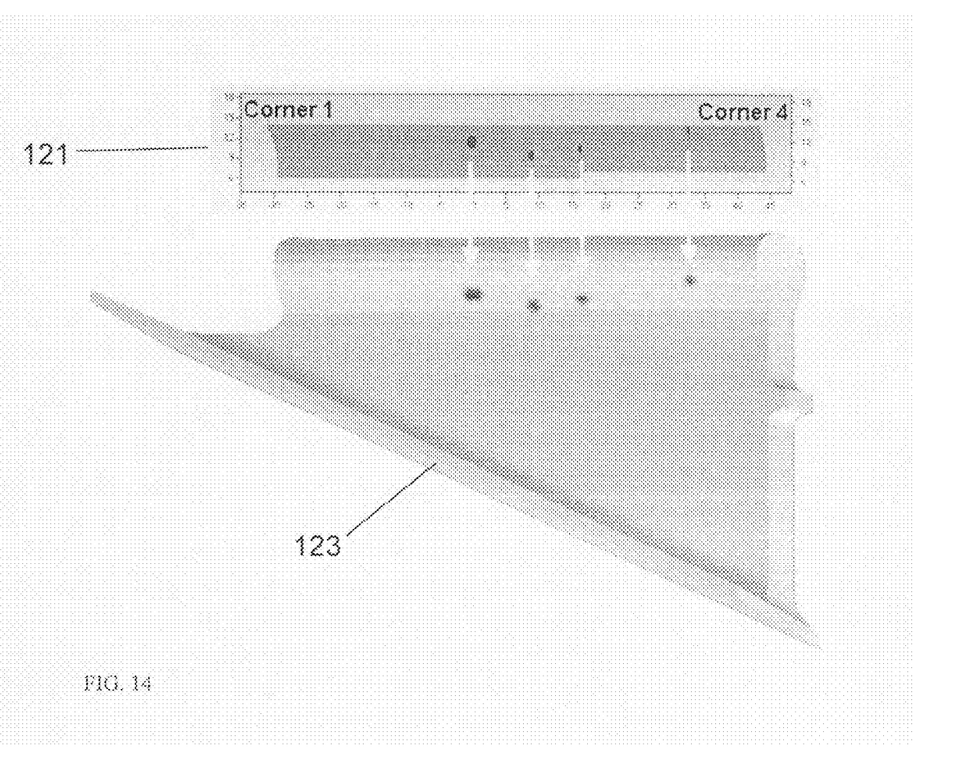
FIG. 14 shows a representative superposition of an eddy current scan image on a CAD drawing of a component.

To facilitate the visualization of MWM-Array inspection data with the component geometry, the inspection data is spatially registered, preferably digitally, to the CAD files for a given component or article. For example, FIG. 14 shows inspection data from an MWM-Array C-Scan image 121 of an engine blade dovetail spatially registered to a CAD drawing 123 of the dovetail. The image 121 in FIG. 14 is a representative spatially filtered C-Scan image from an MWM-Array scan of one side of a blade dovetail. Four crack indications can be seen as dark spots in the C-Scan image. The image 123 shows these four indications spatially registered on a CAD drawing of the dovetail.

This provides for 100% tracking of manufacturing parameters beginning with CAD and CAM files and moving all the way through manufacturing quality inspections (e.g., with eddy current imaging) through in-service inspection (e.g., with eddy current imaging). This effectively provides tracking of the status and quality of the component over the useful life of the component. The design information can be in the form of computer aided design (CAD) and/or computer aided manufacturing (CAM) files. This design information is maintained with the information obtained from manufacturing quality inspections (e.g., with eddy current imaging) and from in-service inspection (e.g., again with eddy current imaging).

Figure 15:
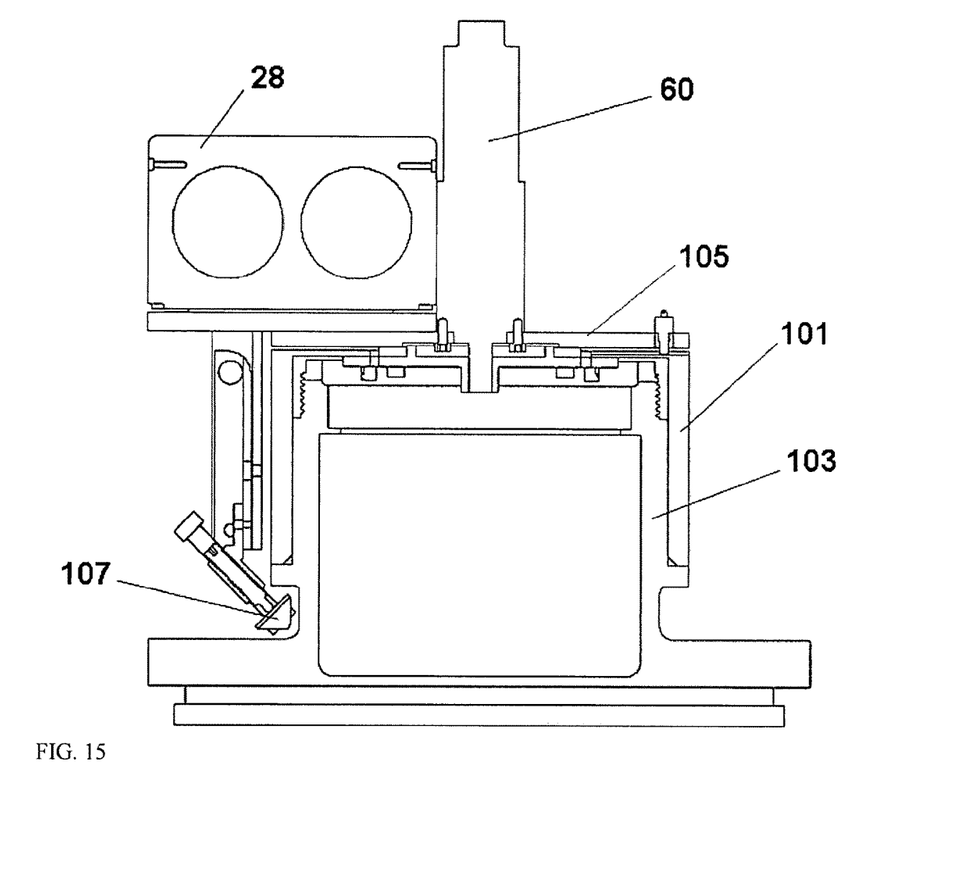
FIG. 15 is a cross-sectional drawing of a sensor scanning around the base of a cylindrical post.

FIG. 15 shows a drawing of a cross-section of an example configuration of a fixture for performing high resolution mapping and tracking of stress relaxation in the radius at the base of a post from the carrier plate of a planetary gear system. A bearing cap 101 is mounted onto the post 103. Attached to the bearing cap is a rotating plate 105 actuated by an electric motor 60. A probe electronics unit 28 and spring loaded scanning tip 107 are attached to the rotating plate. The spring loaded tip presses an MWM-Array sensor into the radius at the base of the post.

While the inventions have been particularly shown and described with reference to preferred embodiments thereof, it will be understood to those skilled in the art that various changes in form and details may be made therein without departing from the spirit and scope of the invention as defined by the appended claims.

REFERENCE INCORPORATED BY REFERENCE IN THEIR ENTIRETY

Auld, B. A. and Moulder, J. C. (1999), "Review of Advances in Quantitative Eddy-Current Nondestructive Evaluation," Journal of Nondestructive Evaluation, vol. 18, No. 1.

Dodd, C., and W. Deeds (1982), "*Absolute Eddy-Current Measurement of Electrical Conductivity*," Review of Progress in Quantitative Nondestructive Evaluation, Vol. 1, 1982. Plenum Publishing Co.

Goldfine, N. (1993), "*Magnetometers for Improved Materials Characterization in Aerospace Applications*," Materials Evaluation Vol. 51, No. 3, pp. 396-405; March 1993.

Goldfine, N., D. Grundy, V. Zilberstein, D. Schlicker, I. Shay, A. Washabaugh, M. Windoloski, M. Fisher, K. LaCivita, V. Champagne (January 2002) "*Corrosion Detection and Prioritization Using Scanning and Permanently Mounted MWM Eddy-Current Arrays*," Tri-Service Corrosion Conference, San Antonio, Tex.; January 2002.

Goldfine, N., D. Schlicker, Y. Sheiretov, A. Washabaugh, V. Zilberstein, D. Grundy, (March 2002) "*Surface Mounted and Scanning Periodic Field Eddy-Current Sensors for Structural Health Monitoring*," IEEE Aerospace Conference, Big Sky, Mont., March 2002.

What is claimed is:

1. A method for inspecting a set of curved components comprising:
    mounting each component of the set of components at discrete locations in a circular carousel;
    rotating the carousel to move each component to at least one inspection site;
    inspecting each component at the inspection site by disposing a flexible sensor proximate to a curved material surface of the component, the sensor having at least one row of aligned sense elements;
    scanning the sensor over the curved material surface; and
    recording sensor position during the scan.
2. The method as claimed in claim 1 wherein the carousel provides a fixture to hold each component in a vertical position.
3. The method as claimed in claim 1 wherein the flexible sensor is an eddy current sensor array.
4. The method as claimed in claim 1 wherein the sensor is clamped against the surface of the component to keep the array proximate to the curved material surface during scanning.
5. The method as claimed in claim 1 further comprising: converting each sense element response into an effective property and sense element proximity to the material surface, and using the effective property to assess the quality of the component.
6. The method as claimed in claim 1 wherein the component is an engine blade.
7. The method as claimed in claim 6 wherein the curved material surface is a blade dovetail.
8. The method as claimed in claim 5 wherein the effective property is electrical conductivity.
9. The method as claimed in claim 5 further comprising: using the sense element proximity information to determine the quality of the scan.
10. The method as claimed in claim 5 wherein quality of the component refers to the presence of cracks.
11. The method as claimed in claim 5 further comprising: superimposing effective property data on an image of the component.
12. The method as claimed in claim 11 further comprising: inspecting the component at multiple times within its useful life to track the progression of changes in the effective property.
13. The method as claimed in claim 1 further comprising: attaching a rigid element to each component, the rigid element providing an extension surface beyond an edge of the component surface, the extension surface approximating the curvature of the curved material surface.
14. The method as claimed in claim 13 further comprising: aligning a rigid element with the curved material surface using a raised edge on the component.
15. The method as claimed in claim 13 further comprising: aligning a rigid element with the curved material surface by inserting at least one cylindrical support into a feature of the component.
16. An apparatus for inspecting a set of curved components comprising:
    a circular carousel to hold each component of the set of components at discrete locations around the carousel;
    a rigid element attached to each component providing an extension surface beyond an edge of the component surface;
    a turntable under the carousel to permit rotation of each component to an inspection site; and
    an actuator to scan a flexible sensor array along a curved material surface of the component, the sensor having at least one row of aligned sense elements.
17. The apparatus as claimed in claim 16 wherein the carousel provides a fixture to hold each component in a vertical orientation.
18. The apparatus as claimed in claim 16 wherein the extension surface approximates a curvature of the curved material surface to be inspected.
19. The apparatus as claimed in claim 16 wherein the sensor is an eddy current sensor.
20. The apparatus as claimed in claim 16 wherein the sensor is clamped against the surface to keep the array proximate to the curved material surface during scanning.
21. The apparatus as claimed in claim 16 wherein the component is an engine blade.
22. The apparatus as claimed in claim 21 wherein the curved material surface is a blade dovetail.
23. The apparatus as claimed in claim 16 wherein the rigid element includes at least one cylindrical support that is inserted into the component.

* * * * *